US009626746B2

(12) United States Patent
Sonoda

(10) Patent No.: US 9,626,746 B2
(45) Date of Patent: Apr. 18, 2017

(54) IMAGE PROCESSING APPARATUS AND IMAGE PROCESSING METHOD

(71) Applicant: SAMSUNG DISPLAY CO., LTD., Yongin-si, Gyeonggi-do (KR)

(72) Inventor: Masatoshi Sonoda, Yokohama (JP)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/855,239

(22) Filed: Sep. 15, 2015

(65) Prior Publication Data
US 2016/0125576 A1 May 5, 2016

(30) Foreign Application Priority Data

Oct. 29, 2014 (JP) ................. 2014-220134

(51) Int. Cl.
G06T 5/00 (2006.01)
G06T 5/20 (2006.01)

(52) U.S. Cl.
CPC ................ G06T 5/003 (2013.01); G06T 5/20 (2013.01)

(58) Field of Classification Search
CPC ........................... G06T 5/00–5/004
See application file for complete search history.

(56) References Cited

U.S. PATENT DOCUMENTS

| 6,094,205 A * | 7/2000 | Jaspers | H04N 5/208 348/234 |
| 6,285,798 B1 * | 9/2001 | Lee | G06T 5/004 382/260 |
| 8,107,012 B2 | 1/2012 | Ojima et al. | |
| 9,374,478 B1 * | 6/2016 | Li | H04N 1/00204 |
| 2006/0164555 A1 * | 7/2006 | Klompenhouwer | G06T 5/004 348/625 |
| 2007/0189633 A1 * | 8/2007 | Cho | G06T 5/50 382/266 |
| 2011/0141368 A1 * | 6/2011 | Wallace | G06T 5/003 348/606 |
| 2011/0243441 A1 * | 10/2011 | Lin | G06T 5/003 382/169 |
| 2012/0070099 A1 * | 3/2012 | Wada | G06T 5/002 382/266 |

(Continued)

FOREIGN PATENT DOCUMENTS

| EP | 2 190 183 A1 | 5/2010 |
| JP | 07-014027 | 1/1995 |

(Continued)

*Primary Examiner* — Sean Motsinger
(74) *Attorney, Agent, or Firm* — F. Chau & Associates, LLC

(57) ABSTRACT

An image processing apparatus includes a gain calculation unit that calculates a gain for each of a plurality of pixels of an image signal, respectively, and an addition unit that adds the gain for each pixel to the corresponding pixel of the plurality of pixels of the image signal. The gain calculation unit includes a first order differential operation unit that calculates a first value from first order differential of the image signal for each of the plurality of pixels and second order differential operation unit that calculates a second value from a second order differential of the image signal for each of the plurality of pixels, and calculates the gains for each pixel based on the first and second values for each pixel.

15 Claims, 16 Drawing Sheets

(56) References Cited

U.S. PATENT DOCUMENTS

2012/0236119 A1* 9/2012 Rhee .................... G01S 3/7864
  348/46
2014/0009469 A1* 1/2014 Shin ....................... G06T 5/003
  345/428

FOREIGN PATENT DOCUMENTS

| JP | 08-096144 | 4/1996 |
| JP | 2008-047950 | 2/2008 |
| JP | 2010-226260 | 10/2010 |

* cited by examiner

IMAGE PROCESSING APPARATUS AND IMAGE PROCESSING METHOD

CROSS-REFERENCE TO RELATED APPLICATIONS

This U.S. non-provisional patent application claims priority under 35 U.S.C. §119 from, and the benefit of, Japanese Patent Application No. JP2014-220134, filed on Oct. 29, 2014, the contents of which are herein incorporated by reference in their entirety.

BACKGROUND

Embodiments of the present disclosure are directed to an image processing apparatus and an image processing method.

By applying a linear filter to extract a contour of an image from an input image signal, and adding (or subtracting) the result obtained by applying the linear filter to the input image signal as a gain, it is possible to enhance the sharpness of the contour of an image and thus sharpen an image. An output image provided as a result of this sharpening operation is a sharper image than the input image represented by the input image signal by increasing the change of the pixel values of a contour having a local varying gray scale.

However, when a sharpening calculation is performed only by a linear operation as described above, the change of the pixel values may affect other pixel values, such as pixel values of a pixel adjacent to a contour pixel. Therefore, when the sharpening calculation is performed only by a linear operation as described above, there is a possibility that an overshoot or undershoot occurs. Also, when an overshoot or undershoot occurs, the output image quality decreases.

Technology that inhibits the overshoot or undershoot has been developed. When the overshoot or undershoot is inhibited at the peak of, such as a thin line or dot in an image to be processed, the output image may not have sufficient sharpness. Therefore, to improve image quality, an overshoot or undershoot may occur based on an input image signal. However, conventional technologies have limits in processing an image to improve image quality.

SUMMARY

Embodiments of the inventive concept can provide an image processing apparatus with improved image quality, and an image processing method.

Embodiments of the inventive concept provide image processing apparatuses that include a gain calculation unit that calculates a gain for each of a plurality of pixels of an image signal, respectively; and an addition unit that adds the gain for each pixel to the corresponding pixel of the plurality of pixels of the image signal, wherein the gain calculation unit includes a first order differential operation unit that calculates a first value from a first order differential of the image signal for each of the plurality of pixels and a second order differential operation unit that calculates a second value from a second order differential of the image signal for each of the plurality of pixels, and calculates the gain for each pixel based on the first and second values for each pixel.

In some embodiments, the first differential may be a spatial difference between pixel values of a target pixel of the plurality of pixels and at least one adjacent pixel adjacent to the target pixel, and the second differential may be a difference between first differential values of the target pixel and at least one pixel adjacent to the target pixel.

In some embodiments, the first value may be calculated based on a first average of absolute values of first order differential values of the target pixel and the at least one adjacent pixel, and the second value may be calculated based on a second average of absolute values of second order differential values of the target pixel and the at least one adjacent pixel.

In other embodiments, the first value may be obtained by multiplying the first average by a first coefficient, and the second value may be obtained by multiplying the second average by a second coefficient.

The first value may be calculated based on a first maximum of absolute values of first order differential values of the target pixel and the at least one adjacent pixel, and the second value may be calculated based on a second maximum of absolute values of second order differential values of the target pixel and the at least one adjacent pixel.

In even other embodiments, the first value may be obtained by multiplying the first maximum by a first coefficient, and the second value may be obtained by multiplying the second maximum by a second coefficient.

In yet other embodiments, the gain calculation unit may include a multiplication unit that calculates gains by adding the first value and the second value for each of the plurality of pixels.

In further embodiments, the multiplication unit multiplies the gains by a frequency component extracted from the image signal.

In further embodiments, the frequency component extracted from the image signal may comprise a sum of two or more band-limited components extracted from the image signal.

In other embodiments of the inventive concept, image processing methods include receiving an input image that includes a plurality of pixels; calculating a gain for each pixel of the plurality of pixels, based on the image signal; and adjusting the image signal by adding the gain to each pixel value of a corresponding pixel of the plurality of pixels, wherein calculating a gain includes: calculating a first value from a first order differential of the input image for each of the plurality of pixels; calculating a second value from a second order differential of the input image for each of the plurality of pixels; and calculating the gain for each pixel based on the first value for each pixel and the second value for each pixel.

In some embodiments, the method may include calculating the first differential from a spatial difference between pixel values of a target pixel of the plurality of pixels and a pixel value of at least one pixel adjacent to the target pixel, and calculating the second differential from a difference between first differential values of the target pixel and at least one pixel adjacent to the target pixel.

In some embodiments, the method may include calculating the first value based on one of an average value or a maximum value of absolute values of first order differential values of the target pixel and the at least one adjacent pixel, and calculating the second value based on one of an average value or a maximum value of absolute values of second order differential values of the target pixel and the at least one adjacent pixel.

In some embodiments, the method may include multiplying the first value by a first coefficient, and multiplying the second value by a second coefficient.

In some embodiments, the method may include calculating gains by adding the first value and the second value for each of the plurality of pixels.

In some embodiments, the method may include multiplying the gains by a frequency component extracted from the image signal.

In some embodiments, the frequency component extracted from the image signal may include a sum of two or more band-limited components extracted from the image signal.

In other embodiments of the inventive concept, image processing apparatuses include a gain calculation unit that calculates a gain for each of a plurality of pixels of an image signal. The gain calculation unit includes a first order differential operation unit that calculates a first value from a first order differential of the image signal for each of the plurality of pixels, a second order differential operation unit that calculates a second value from a second order differential of the image signal for each of the plurality of pixels, and calculates the gain for each pixel based on the first and second values for each pixel, a frequency component extraction unit that extracts one or more frequency components from the image signal, and a multiplication unit that calculates a gain for each pixel by multiplying the one or more frequency components by a sum of the first value for each pixel and the second value for each pixel.

In some embodiments, the apparatuses may include an addition unit that adds the gain for each pixel to the corresponding pixel of the plurality of pixels of the image signal.

In some embodiments, the frequency component extraction unit may includes one or more band-pass filters, wherein each band pass filter outputs a band-limited signal of a different frequency component of the image signal, and the frequency component extraction outputs a sum of the band-limited signals output by each of the one or more band-pass filters.

In some embodiments, the apparatuses may include a first adjustment unit that multiplies the first value by a first coefficient, and a second adjustment unit that multiplies the second value by a second coefficient.

By using the method, it is possible to adjust an overshoot or undershoot amount optimal to an input image according to an input image (an image to be processed) that an input image signal represents. Thus, by using the method, it is possible to lead to the image to be processed to have high image quality.

DETAILED DESCRIPTION

Exemplary embodiments of the inventive concept are described hereinbelow in detail with reference to the accompanying drawings. However, components having substantially the same functions may be denoted by like numerals in the present disclosure and accompanying drawings and thus repetitive descriptions are omitted.

In addition, although an image is typically represented as a 2D signal, it may be described below using a 1D signal for the convenience of description.

In the following, there are cases where a pixel adjacent horizontally to a target pixel being processed is represented by a "left pixel" or a "right pixel". Signal processing methods according to an image processing method according to an embodiment of the inventive concept may process a 2D image by sequentially applying with respect to the vertical and horizontal directions of the image. When a signal processing according to an image processing method according to an embodiment of the inventive concept is applied in the vertical direction, the "left pixel" and the "right pixel" are changed to an "upper pixel" and a "lower pixel", so that the same signal processing as that to be described below can be performed.

An image processing method according to an embodiment of the inventive concept is described.

As described above, when a conventional technology is used, it may not be possible to process an image to have higher image quality.

Figure 1A:
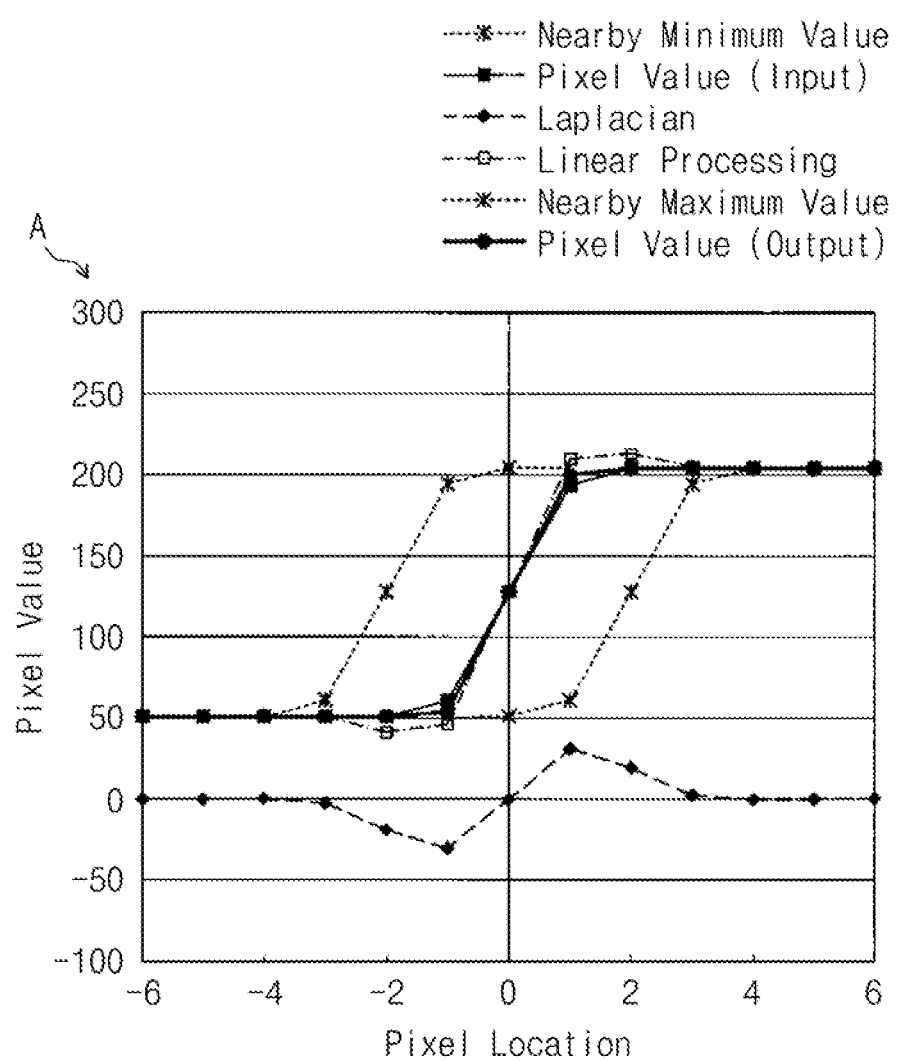
FIGS. 1A and 1B represent examples of a result processed using a conventional technology.
Figure 1B:
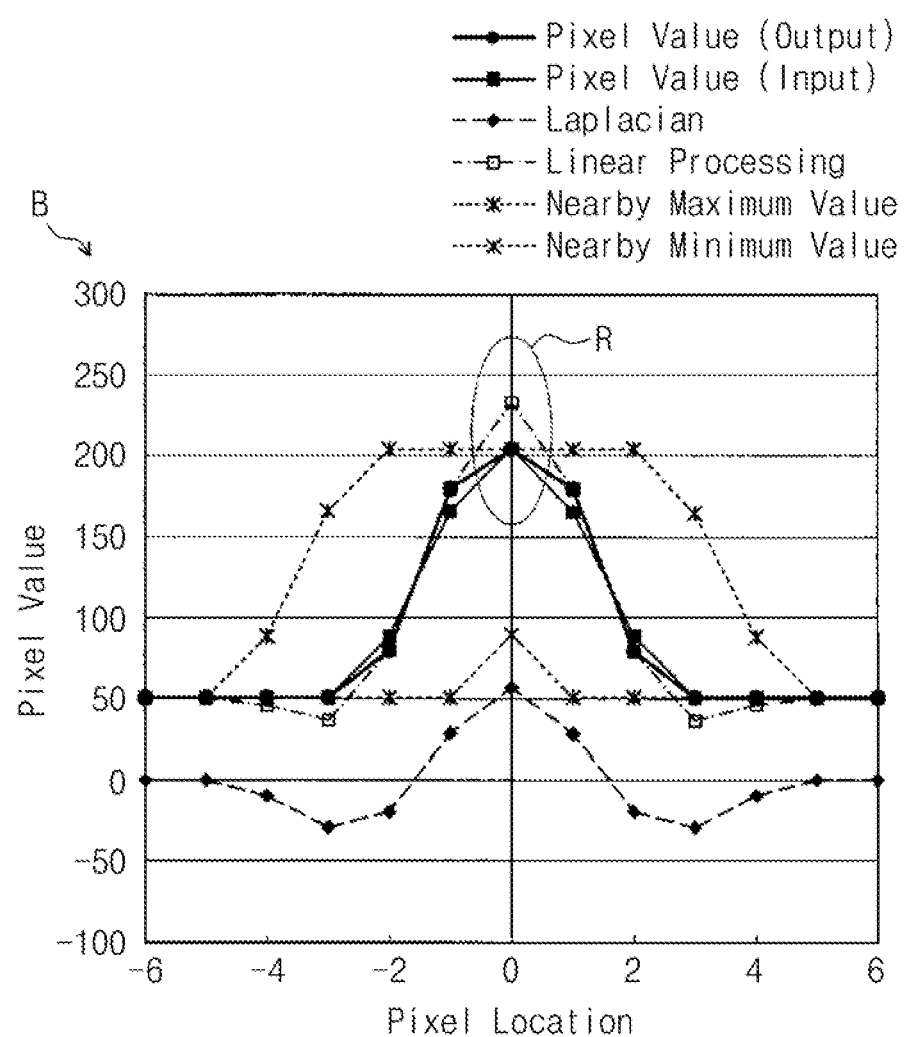

FIGS. 1A and 1B represent examples of a result processed by performing linear processing using a conventional technology that applies a Laplacian operator to sharpen an image. In addition, FIGS. 2A and 2B represent other examples of a result processed by performing linear processing that applies a Laplacian operator to sharpen an image.

Figure 2A:
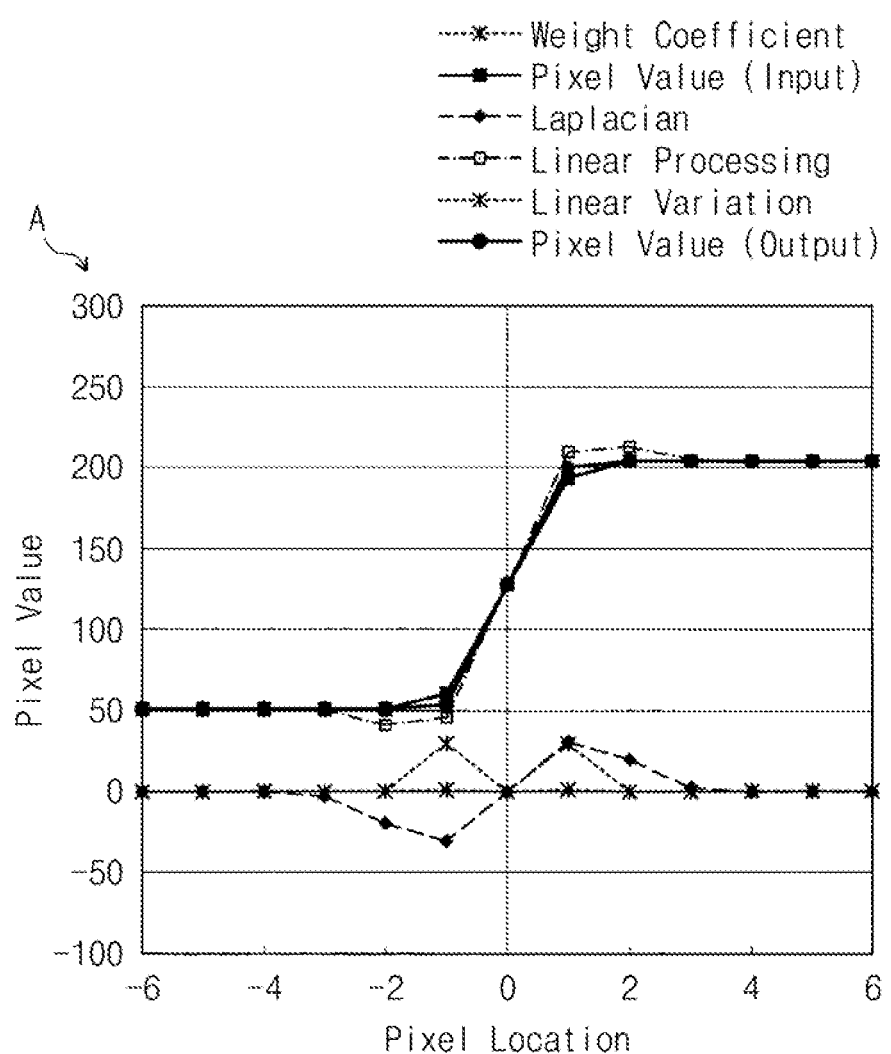
FIGS. 2A and 2B represent examples of a result processed using a conventional technology.

When a step-shape "pixel value (input)" in FIGS. 1A and 2A are processed using a conventional technology, an linearly processed output image does not overshoot or undershoot but has a steep change, as represented by the "pixel value (output)" in FIGS. 1A and 2A.

Figure 2B:
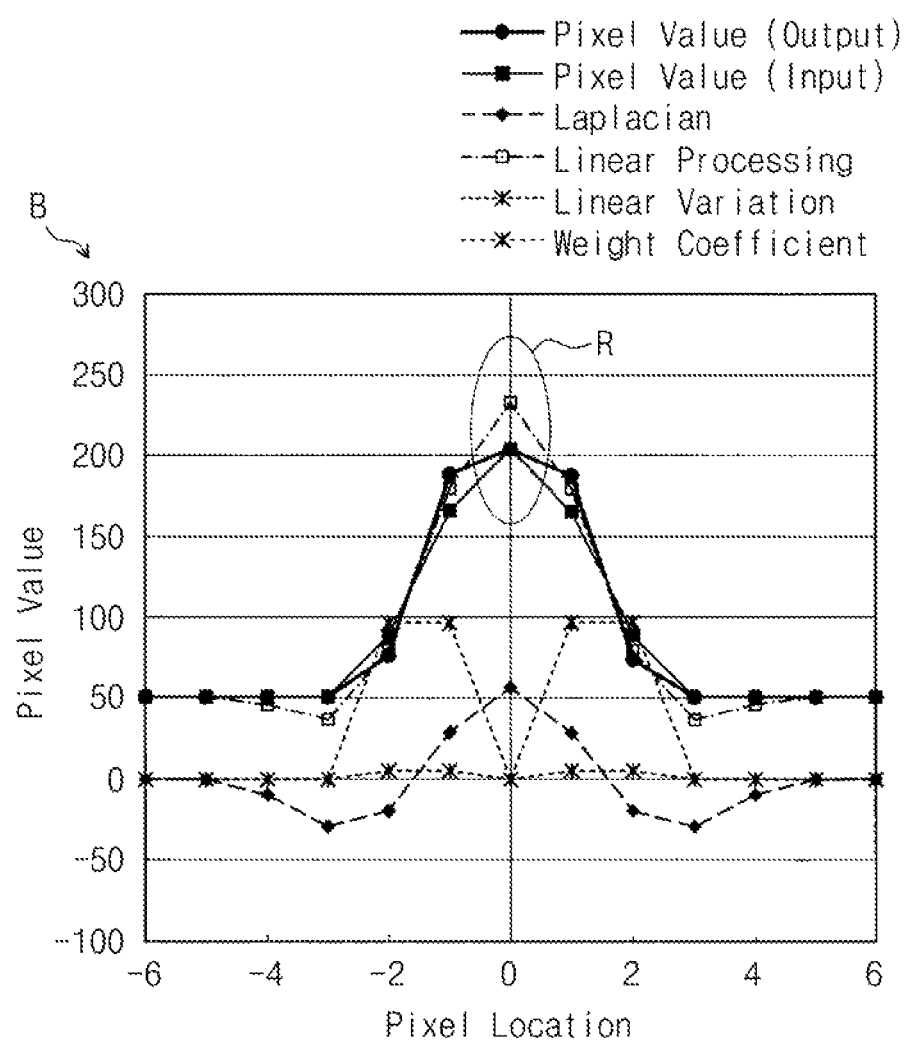

In addition, when a part representing a thin line or dot, such as the peaked pixel value inputs in FIGS. 1B and 2B is processed by using a conventional technology, it is possible to inhibit undershoot at opposite ends of a line. However, when a part representing a thin line or dot of an image is processed using a conventional technology, even an overshoot of a peak that can sharpen the image is inhibited, as represented by region "R" in FIGS. 1B and 2B.

Figure 3A:
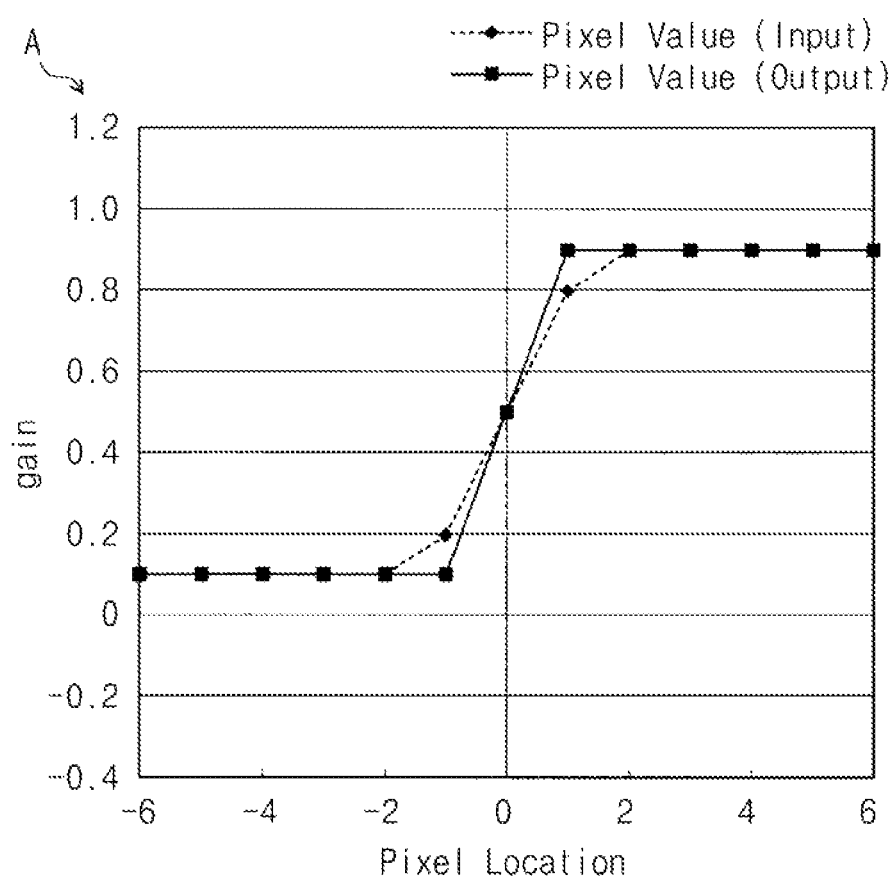
FIGS. 3A and 3B illustrate examples of a result of sharpening an ideal image.
Figure 3B:
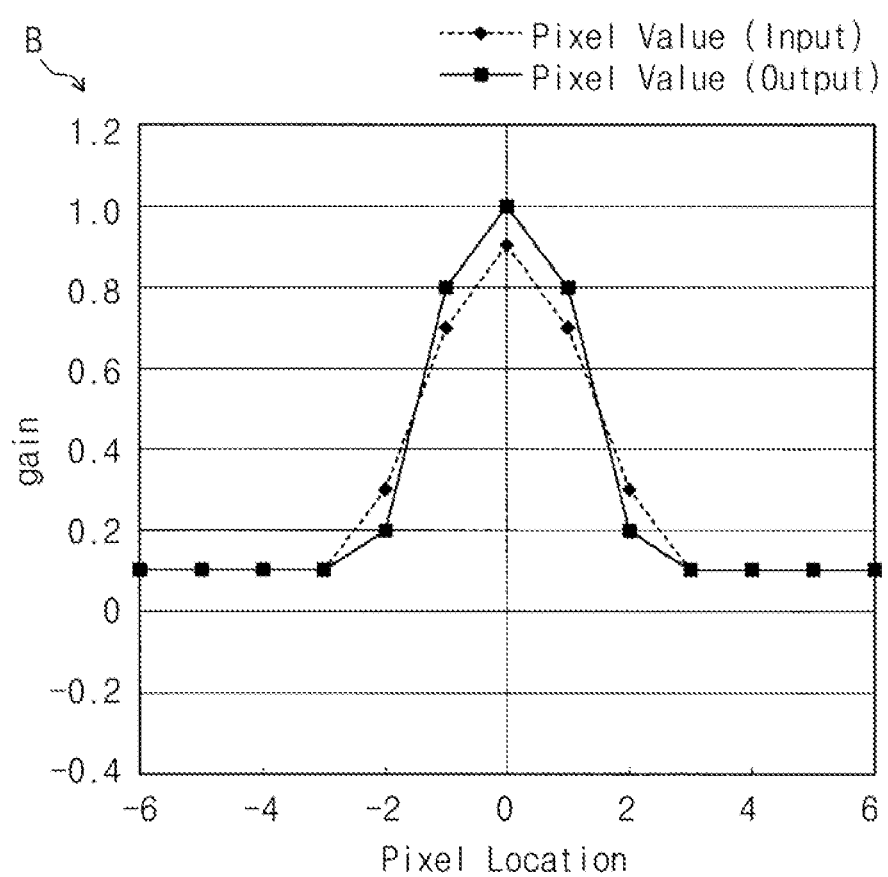

FIGS. 3A and 3B illustrate examples of result of sharpening an ideal image. In FIGS. 3A and 3B, the "pixel value (input)" represents examples of pixel values of an input image and "pixel value (output)" represents examples of pixel values of an output image.

To sharply show an image to a user with high image quality, an output image may be provided with characteristics represented below, by processing an input image.

The change of pixel values in a contour of an image should be steep with respect to the input image and the overshoot or undershoot should be small (see FIG. 3A).

A pixel value peak corresponding to a line or dot in an image should have a larger amplitude than the input image (see FIG. 3B).

For example, sharpening an ideal image may use an operation to inhibit overshoot or undershoot on a step part and allow an overshoot and undershoot on a peak part, as represented in FIGS. 3A and 3B.

In this example, an image processing apparatus according to an embodiment of the inventive concept can adjust the amount of overshoot or undershoot of an input image based on local variations in the input image represented by an input image signal.

More particularly, an image processing apparatus according to an embodiment of the inventive concept calculates, for each target pixel, a gain for the input image signal based on the input image signal.

In this example, an optimal overshoot or undershoot may be set based on the relationship between the first order differential and second order differential of a pixel value. A first differential according to an embodiment of the inventive concept indicates, for example, the spatial difference between pixel values of adjacent pixels, such as the target pixel and at least one pixel adjacent to that pixel, and a second differential according to an embodiment of the inventive concept indicates, for example, the difference between first differential values of adjacent pixels, such as the target pixel and at least one pixel adjacent to that pixel. An example of a differential operation according to an embodiment of the inventive concept is described below.

An image processing apparatus according to an embodiment of the inventive concept calculates a gain for each target pixel by using a first value representing a result of first order differential of an image signal for each target pixel and a second value representing a result of second order differential of an image signal for each target pixel. A particular example is described below of each gain calculation according to an embodiment of the inventive concept, the first value representing the result of first order differential of an image signal according to an embodiment of the inventive concept and the second value representing the result of second order differential of an image signal according to an embodiment of the inventive concept.

In addition, an image processing apparatus according to an embodiment of the inventive concept adds a pixel value of an image signal and a corresponding gain, for each target pixel. Since the pixel value and gain according to the shape of an input image are added for each target pixel, the following effects may be together realized.

Overshoot or undershoot that can degrade image quality can be inhibited around a part of an input image where pixel values vary stepwise.

Overshoot or undershoot can be allowed around a thin line or peak part of an input image.

Thus, since an image processing apparatus according to an embodiment of the inventive concept can sharpen an input image being processed, it is possible to improve image quality.

An example of a configuration of an image processing apparatus according to an embodiment of the inventive concept that can process an image according to a method according to an embodiment of the inventive concept as described above is described hereinbelow.

Figure 4:
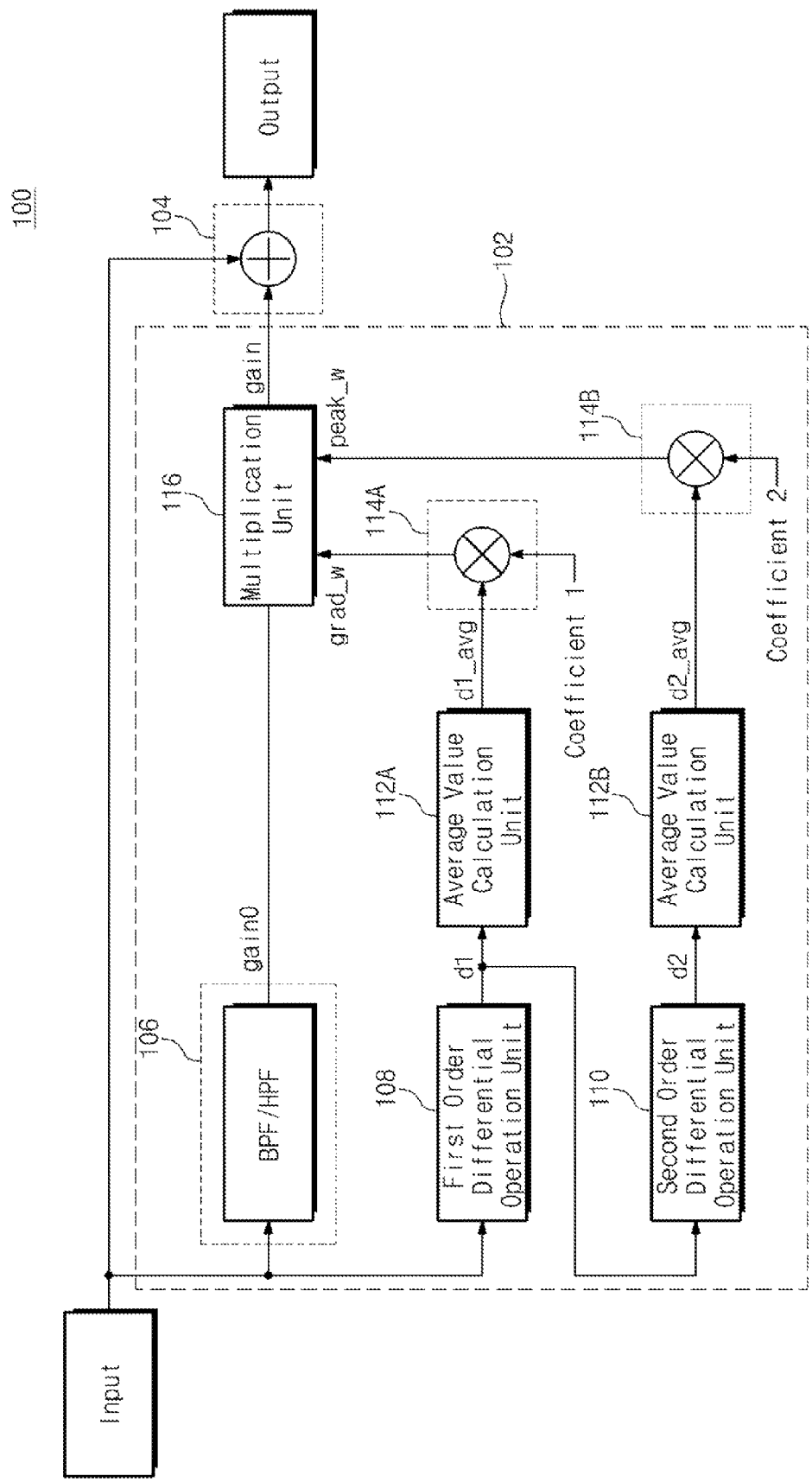
FIG. 4 is a block diagram of an example of an image processing apparatus according to an exemplary embodiment.

FIG. 4 is a block diagram of an example of an image processing apparatus 100 according to an exemplary embodiment. In FIG. 4, "input" represents an input image signal, and "output" represents an image signal after being processed according to an image processing method according to an embodiment of the inventive concept.

An image processing apparatus 100 includes a gain calculation unit 102 and an addition unit 104.

The image processing apparatus 100 includes, e.g., a processor, such as a central processing unit (CPU), or various other processing circuits and may also include a control unit that controls the image processing apparatus 100. When the control unit is included, the control unit in the image processing apparatus 100 may also function as the gain calculation unit 102 and the addition unit 104.

In addition, it is to be understood that any one or both of the gain calculation unit 102 and the addition unit 104 may be implemented in a processing circuit, such as a special processing circuit or general processing circuit, separate from the control unit. Further, the processing of any one or both of the gain calculation unit 102 and the addition unit 104 may also be realized by a program executed by a processor.

The gain calculation unit 102 calculates a gain for each target pixel based on an input image signal.

The gain calculation unit 102 includes a frequency component extraction unit 106, a first order differential operation unit 108, a second order differential operation unit 110, average value calculation units 112A and 112B, adjustment units 114A and 114B, and a multiplication unit 116.

The frequency component extraction unit 106 includes a filter for linear signal processing, such as a band pass filter (BPF) or high pass filter (HPF), and outputs a frequency component signal set from the input image signal. A frequency component set may include, e.g., an intermediate frequency band to high frequency band of the input image signal. In FIG. 4, a band-limited signal output from the frequency component extraction unit 106 is represented by "gain0".

A filter of a frequency component extraction unit 106 may be, e.g., a BPF as represented on the right hand of Equation (1) below:

$$\text{Gain0}=[-1/4,0,1/2,0,-1/4]\otimes\text{input} \qquad (1)$$

where the operator on the right side in Equation (1) above represents linear convolution, which is also the same in other equations to be described below. In particular, when an input in Equation (1) above is pixel values of consecutive pixels, such as [a0, a1, a2, a3, a4] around a target pixel a2, Gain0=$-1/4*a0+1/2*a2+-1/4*a4$ from Equation (1) above.

However, embodiments are not limited thereto, and the filter of the frequency component extraction unit 106 is not limited to BPF represented in Equation (1) and may be any linear filter.

The first order differential operation unit 108 calculates an absolute value of a first order differential value for each target pixel.

As described above, a differential according to an embodiment of the inventive concept means, e.g., taking the spatial difference between adjacent pixels, and the first order differential operation unit 108 may obtain an absolute value d1 of a first order differential value through convolution of a BPF the input, as represented by Equation (2) below:

$$d1=[-1/2,0,1/2]\otimes\text{input} \qquad (2).$$

The second order differential operation unit 110 calculates an absolute value of a second order differential value for each target pixel.

The second order differential operation unit 110 uses the same BPF as Equation (2) above by using the first order absolute differential value d1 of each pixel to calculate the absolute value d2 of a second order differential value, as represented by Equation (3) below:

$$d2=[-1/2,0,1/2]\otimes d1 \qquad (3)$$

However, embodiments are not limited thereto, and a method of calculating a second order absolute differential value d2 is not limited to a calculation method by the operation represented by Equation (3) above.

For example, the second order differential operation unit 110 may also calculate the second order absolute differential value d2 by directly applying a second order differential filter, i.e., without passing through the first order differential operation unit 108. For example, the second order differential operation unit 110 may use a sign negation of the BPF in the frequency component extraction unit 106 to calculate the absolute value d2 of the second order differential value, as represented by Equation (4) below:

$$d2=[1/4,0,-1/2,0,1/4]\otimes\text{input} \qquad (4).$$

The average value calculation unit 112A calculates an average value d1_avg of the first order absolute differential values d1 for a plurality of pixels, including the target pixel.

For example, when the average value calculation unit 112A calculates the average value d1_avg of three pixels, a target pixel, a left pixel, and a right pixel, the average value calculation unit 112A calculates the average value d1_avg by Equation (5) below:

$$d1\_avg = \frac{d1 \text{ of left pixel} + d1 \text{ of target pixel} + d1 \text{ of right pixel}}{3}. \qquad (5)$$

In addition, the average value calculation unit 112A may calculate, as the average value d1_avg, the average value d1 of the absolute value d1 of the first order differential values of four or more pixels. Further, the average value calculation unit 112A may also calculate the average value d1_avg using any average value calculation method, such as a weighted average.

The average value calculation unit 112B calculates an average value d2_avg of the second order absolute differential values d2 for a plurality of pixels, including the target pixel.

For example, when the average value calculation unit 112B calculates the average value d2_avg of three pixels, a target pixel, a left pixel, and a right pixel, the average value calculation unit 112B calculates the average value d2_avg by Equation (6) below:

$$d2\_avg = \frac{d2 \text{ of left pixel} + d2 \text{ of target pixel} + d2 \text{ of right pixel}}{3}. \qquad (6)$$

In addition, the average value calculation unit 112B may calculate, as the average value d2_avg, the average value d2 of the second order absolute differential values d2 of four or more pixels. Further, the average value calculation unit 112B may also calculate the average value d1_avg by any average value calculation method, such as a weighted average.

The adjustment unit 114A multiplies a first coefficient 1 by the average value d1_avg of each target pixel to calculate a first value "grad_w" for each target pixel, as represented by Equation (7) below.

The first coefficient 1 may be, e.g., a preset fixed value or a variable value that may be adjusted by a user of the image processing apparatus 100. A particular example of the first coefficient 1 is described below.

$$\text{grad\_w} = \text{coefficient } 1 \times d1\_avg \qquad (7).$$

The adjustment unit 114B multiplies a second coefficient 2 by the average value d2_avg of each target pixel to calculate a second value "peak_w" for each target pixel, as represented by e.g., Equation (8) below.

The second coefficient 2 may be, e.g., a preset fixed value or a variable value that may be adjusted by a user of the image processing apparatus 100. A particular example of the second coefficient 2 is described below.

$$\text{peak\_w} = \text{coefficient } 2 \times d2\_avg \qquad (8).$$

The multiplication unit 116 includes a multiplier and uses the "grad_w" in Equation (7) above and the "peak_w" in Equation (8) above to calculate a gain for each target pixel.

More particularly, the multiplication unit 116 calculates a value that represents the relationship between the first order differential and the second order differential by adding "grad_w" from Equation (7) and "peak_w" from Equation (8) to calculate a gain for each target pixel. For a particular example, the multiplication unit 116 outputs a gain for each target pixel by an operation in Equation (9) below:

$$\text{gain} = \text{gain0} \times (\text{grad\_w} + \text{peak\_w})/\text{normalization coefficient} \qquad (9)$$

where the normalization coefficient in Equation (9) above normalizes the result of the right side of Equation 9 to the word size of gain. For example, when a pixel value is represented by an 8 bit integer value in the range 0 to 255, the normalization coefficient is set to 256.

In addition, the normalization coefficient in Equation (9) above depends on the notation of the pixel value, and not needed when, e.g., the pixel value is represented by a floating point number in the range of about 0 to about 1.

For example, the multiplication unit 116 multiplies the added value for each target pixel by the gain0, the band-limited signal extracted from the input image signal and output from the frequency component extraction unit 106, for each target pixel to calculate a gain for each target pixel, as represented in Equation 9 above.

The gain calculation unit 102 includes the frequency component extraction unit 106, the first order differential operation unit 108, the second order differential operation unit 110, the average value calculation units 112A and 112B, the adjustment units 114A and 114B, and the multiplication unit 116 to calculate a gain for each target pixel, as represented in FIG. 4.

However, the configuration of the first gain calculation unit 102 of an image processing apparatus according to an exemplary embodiment of the inventive concept is not limited to that in FIG. 4.

For example, the gain calculation unit 102 may also include maximum value calculation units instead of the average value calculation units 112A and 112B.

A maximum value calculation unit can select the maximum value of the first order absolute differential values d1 of a plurality of pixels, including a target pixel, and output that maximum value. In addition, the maximum value calculation unit can select the maximum value of the second order absolute differential values d2 of a plurality of pixels, including a target pixel, and output that maximum value.

Further, the gain calculation unit 102 may lack, e.g., the adjustment units 114A and 114B shown in FIG. 4.

When the configuration lacks the adjustment unit 114A, the average value d1_avg (or the maximum value) of each target pixel corresponds to a first value for each target pixel, as represented by Equation (7) above. Also, when the configuration lacks the adjustment unit 114B, the average value d2_avg (or the maximum value) of each target pixel corresponds to a second value for each target pixel, as represented by Equation (8) above.

In addition, when the configuration lacks the adjustment units 114A and 114B, the multiplication unit 116 uses e.g., the average value d1_avg (or the maximum value) of each target pixel and the average value d2_avg (or the maximum value) of each target pixel, instead of "grad_w" and "peak_w", to perform the operations of Equation 9 above to calculate a gain for each target pixel.

The addition unit 104 adds a pixel value of an input image signal and a corresponding gain for each target pixel. The addition unit 104 includes, e.g., an adder.

The addition unit 104 performs an operation in, e.g., Equation 10 below, and outputs an image signal processed according to an image processing method according to an embodiment of the inventive concept.

$$\text{Output} = \text{input} + \text{gain} \quad (10).$$

An image signal output from the addition unit 104 may be transmitted to a display device to be displayed on a display screen and recorded in a recording medium. Control of the display screen or the recording medium is performed by, e.g., a control unit or other external device.

The image processing apparatus 100 includes, e.g., the gain calculation unit 102 and the addition unit 104 and thus performs a gain calculation and addition according to an image processing method according to an embodiment of the inventive concept.

An example of an operation of the image processing apparatus 100 is described below. In the following, a step-shape "input" in FIGS. 1A and 2A and a mountain-shape "input" in FIGS. 1B and 2B are described.

The image processing apparatus 100 calculates, by Equation 1 above, the band-limited signal "gain0", obtained by linear processing.

The image processing apparatus 100 calculates the first order absolute differential value d1 by, e.g., Equation (2) above. The image processing apparatus 100 also calculates the second order absolute differential value d2 by, e.g., Equation (4) above.

Figure 5A:
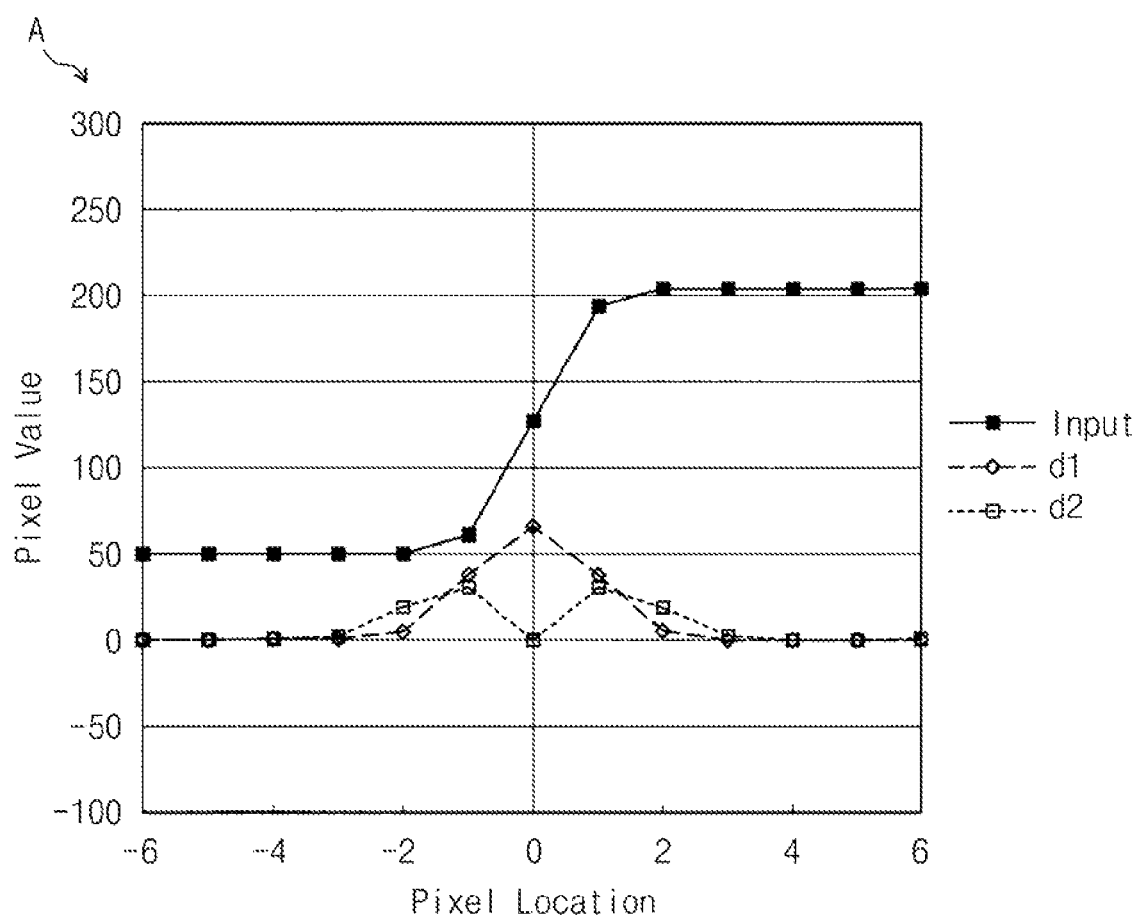
FIGS. 5A and 5B illustrate examples of an operation of an image processing apparatus according to an exemplary embodiment.
Figure 5B:
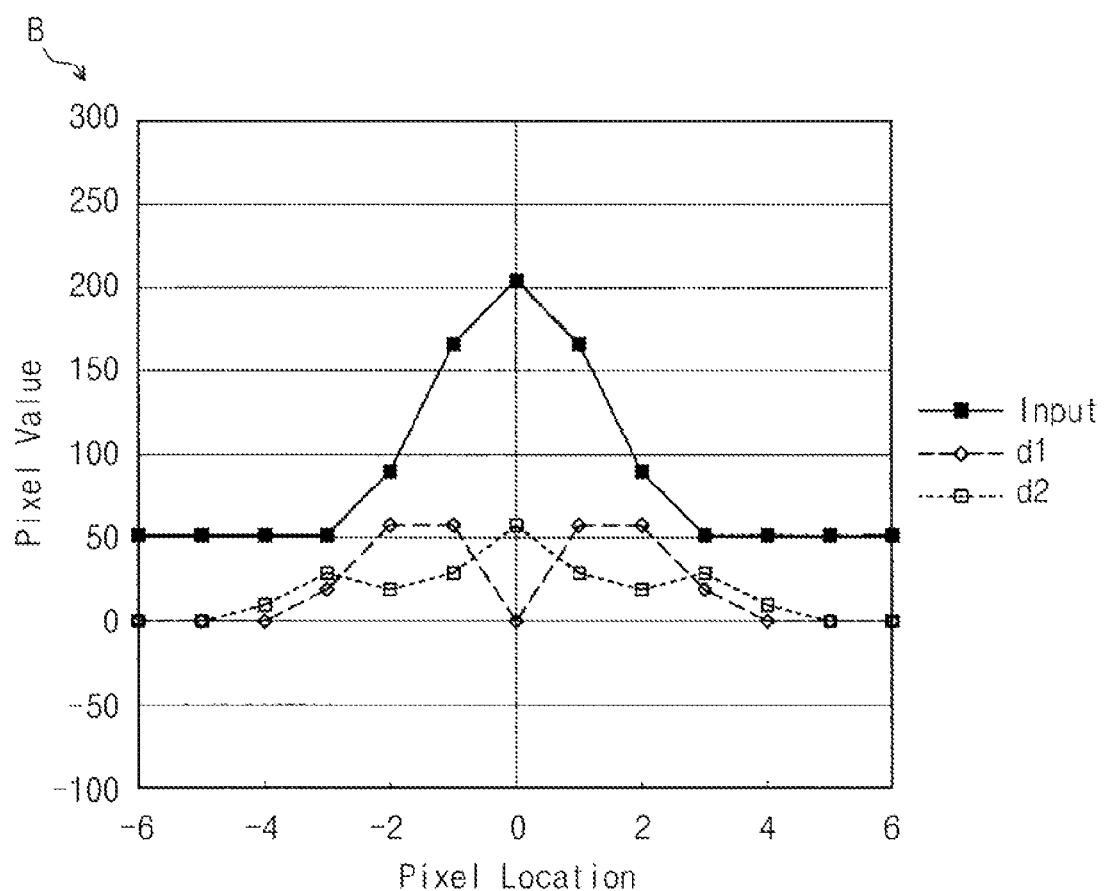

FIGS. 5A and 5B illustrate examples of an operation of the image processing apparatus 100 according to an exemplary embodiment and represent examples of the first order absolute differential value d1 and the second order absolute differential value d2. FIG. 5A represents examples of the first order absolute differential value d1 and the second order absolute differential value d2 for a step-shape "input". FIG. 5B represents examples of the first order absolute differential value d1 and the second order absolute differential value d2 for a peak-shape "input".

As represented in FIG. 5A, for a step-shape "input", the first order absolute differential value d1 dominates around the intermediate part of a slope. In other words, the first order absolute differential value d1 around the intermediate part of the slope is greater than the second order absolute differential value d2 around the intermediate part thereof.

As represented in FIG. 5B, for a peak-shape "input", the first order absolute differential value d1 is greater on both sides of the peak and the second order absolute differential value d2 is greater at the peak itself.

Referring to FIGS. 5A and 5B, graphs of the first order absolute differential value d1 and the second order absolute differential value d2 show that the first order absolute differential value d1 corresponds to the first order differential of "input" and the second order absolute differential value d2 corresponds to the second order differential of "input".

The image processing apparatus 100 calculates an average value d1_avg and an average value d2_avg by, e.g., Equations (5) and (6) above.

In this example, the operations of Equations (5) and (6) above smooth the three adjacent pixels and the local amplitudes of the first order absolute differential value d1 and the second order absolute differential value d2. Thus, the average value d1_avg and the average value d2_avg obtained by Equations (5) and (6) above may be used as signals that respectively represent a location having a steep slope where the first order differential is dominant, incline and a location close to the peak where the second order differential is dominant.

Figure 6A:
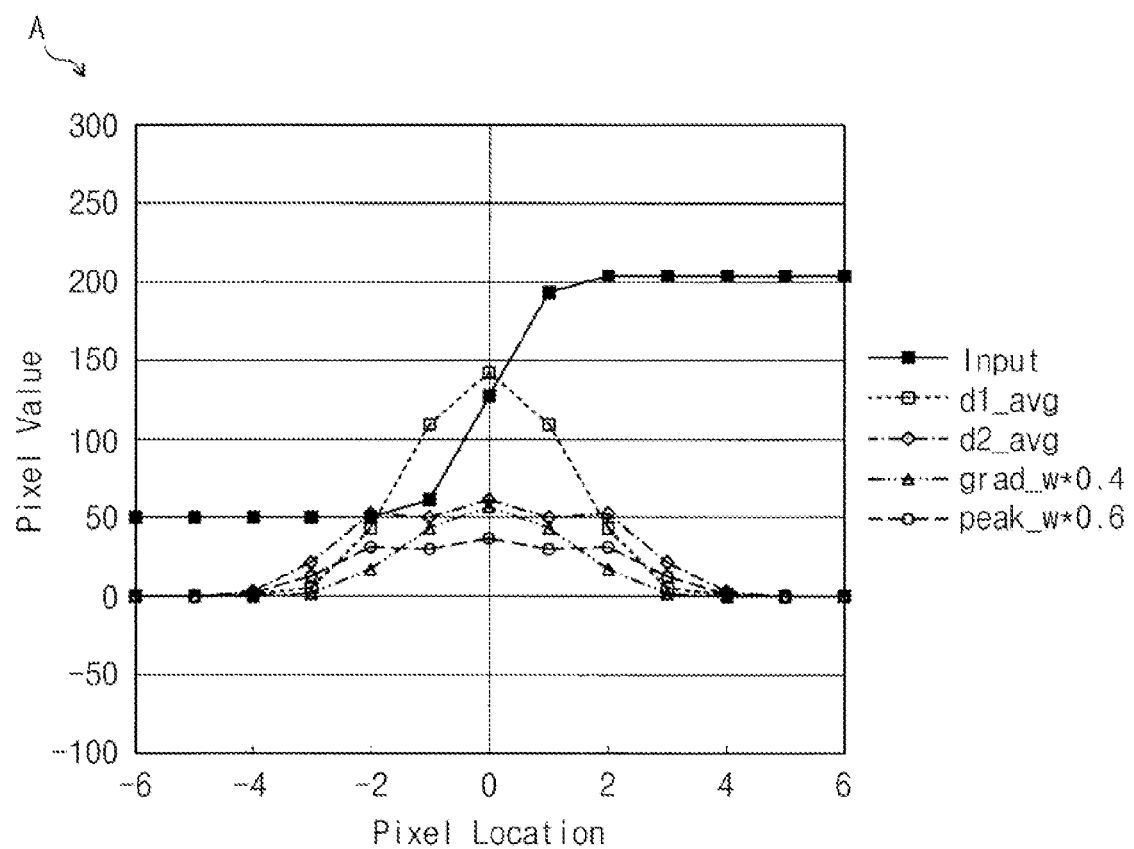
FIGS. 6A and 6B illustrate examples of an operation of an image processing apparatus according to an exemplary embodiment.
Figure 6B:
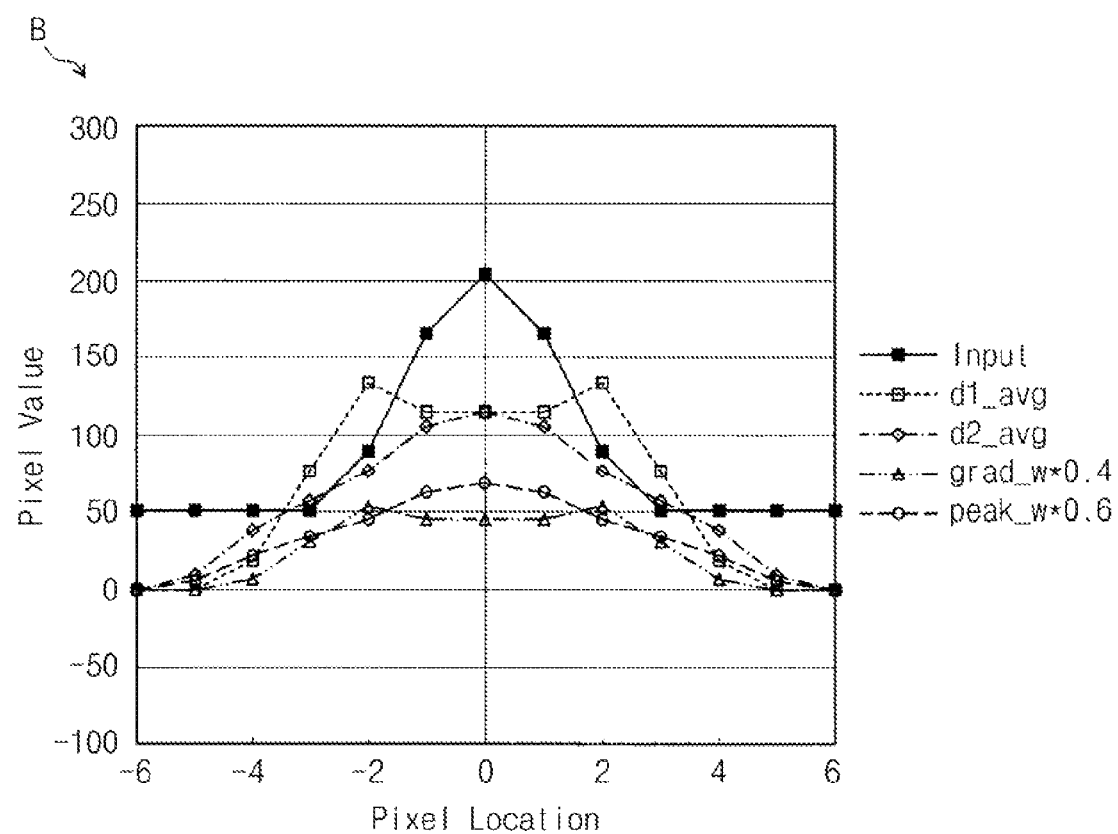

FIGS. 6A and 6B illustrate examples of an operation of the image processing apparatus 100 according to an exemplary embodiment and illustrate examples of an average value d1_avg, an average value d2_avg, grad_w and peak_w. FIG. 6A represents examples of an average value d1_avg and an average value d2_avg for a step-shape input and examples of grad_w and peak_w for that input. Also, FIG. 6B represents examples of an average value d1_avg and an average value d2_avg for a peak-shape input and examples of grad_w and peak_w for that input.

For a step-shape input, the average value d1_avg is greatest in the region of the step, as shown in FIG. 6A. For a peak-shape input, the average value d2_avg around the peak increases to have substantially the same value as the average value d1_avg, as shown in FIG. 6B.

Thus, by adjusting, e.g., the first coefficient 1 in Equation (7) above or the second coefficient 2 in Equation (8) above, it is possible to adjust the magnitude of the slope and to emphasize the peak.

For example, when the first coefficient 1 is about 0.4 and the second coefficient 2 is about 0.6, grad_w and peak_w have values shown in the graphs of FIGS. 6A and 6B. In addition, it is to be understood that in other embodiments, the first coefficient 1 is not limited to a value of about 0.4 and that the second coefficient 2 is not limited to a value of about 0.6.

As shown in FIG. 6A, it may be seen that for a step-shape input, grad_w, which represents the magnitude of a slope, is greatest around a contour in an image on which emphasis processing is performed. As shown in FIG. 6B, it may be seen that for a peak-shape input, peak_w, which represents the magnitude of the peak, is greatest around a contour of an image on which emphasis processing is performed.

From the operations in Equations (7) and (8), it is possible to emphasize a peak and to adjust an overshoot or undershoot as a side effect.

For example, when the first coefficient 1 in Equation (7) is greater than 0.4, the image processing apparatus 100 may increase the gradient of a slope without significantly changing the behavior of the peak, without an overshoot or undershoot. In addition, when the second coefficient 2 in Equation (8) is greater than 0.6, the image processing apparatus 100 may emphasize the peak, without an overshoot or undershoot.

The image processing apparatus 100 uses "gain0" calculated by Equation (1) above, "grad_w" calculated by Equation (7) above, and "peak_w" calculated by Equation (8) above, to perform an operation in, e.g., Equation (9) above to calculate a gain for each target pixel.

Figure 7A:
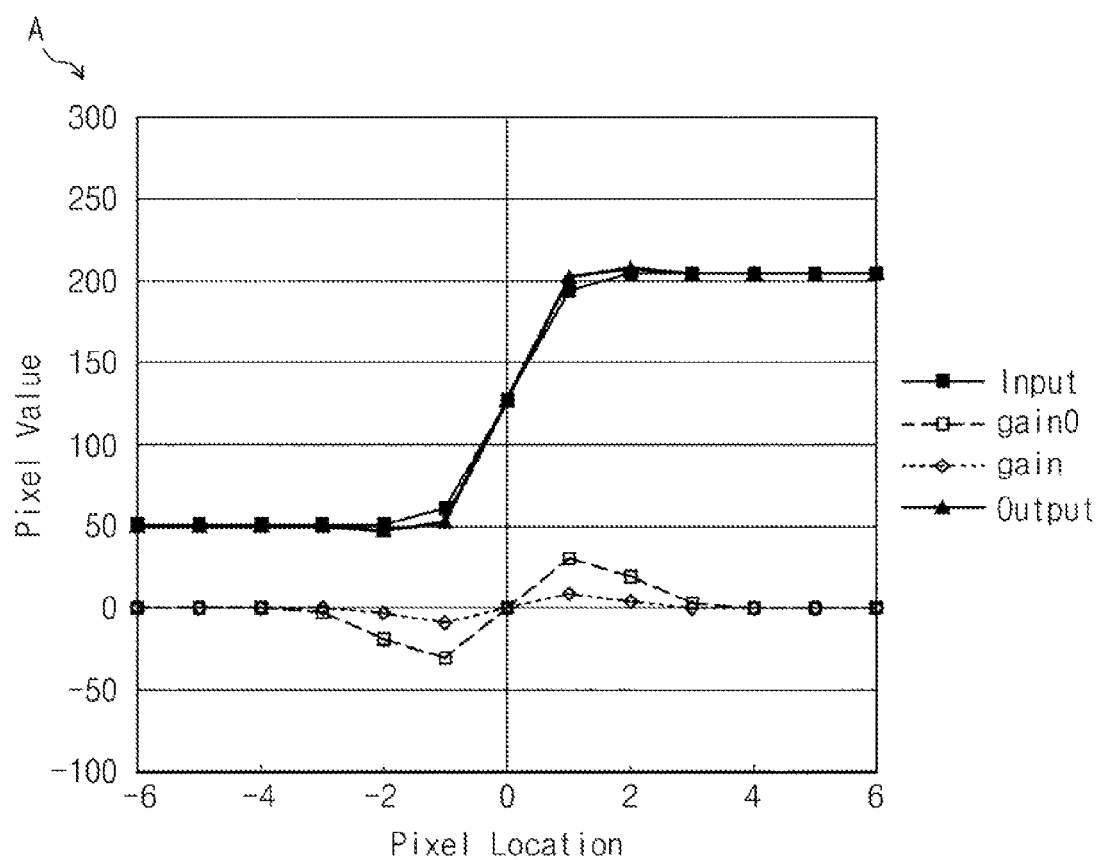
FIGS. 7A and 7B illustrate examples of an operation of an image processing apparatus according to an exemplary embodiment.
Figure 7B:
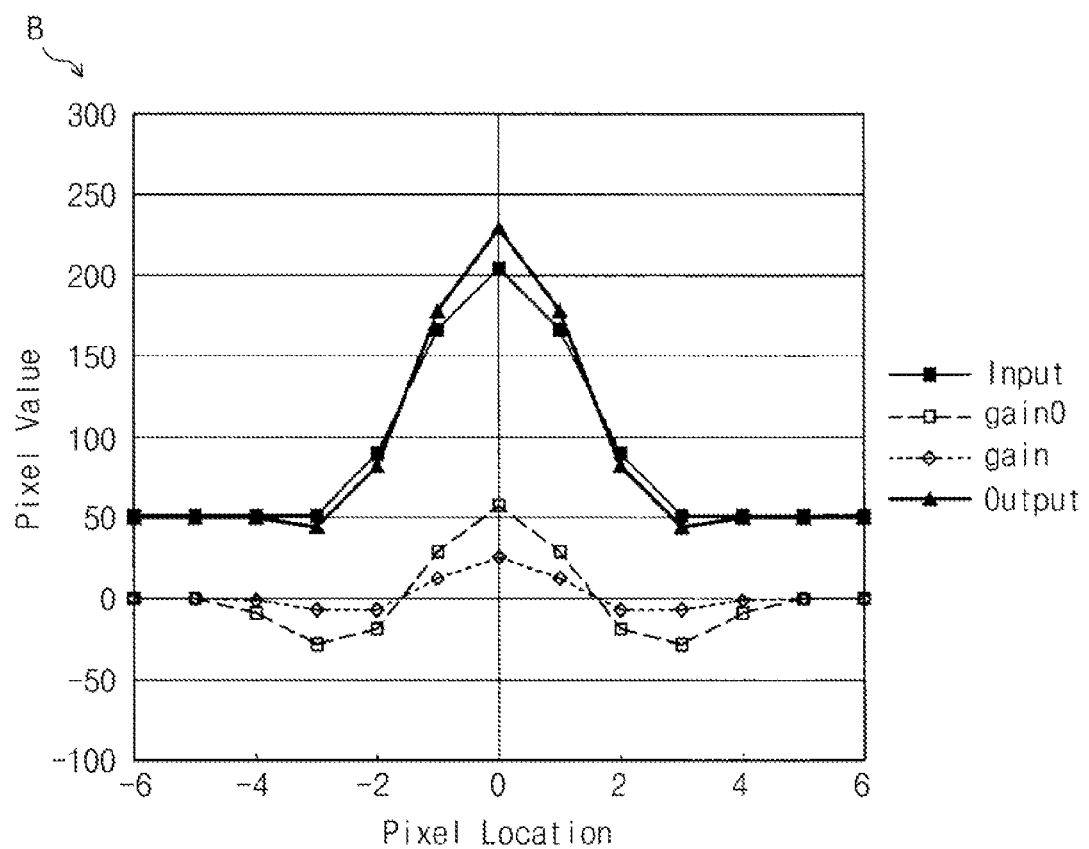

FIGS. 7A and 7B illustrate examples of an operation of the image processing apparatus 100 according to an exemplary embodiment and illustrate behavior examples of "gain0" calculated by linear processing in Equation (1) above and "gain" calculated by Equation (9) above. FIG. 7A illustrates examples of gain0 and gain for a step-shape input, and, FIG. 7B illustrates examples of gain0 and gain for a peak-shape input.

As shown in FIG. 7A, it may be seen that the image processing apparatus 100 sharpens an image by increasing a slope of the step-shape input, in the same way as when conventional technology is applied, as shown in FIG. 1A or 2A.

For a peak-shape input, the image processing apparatus 100 increases the pixel value of the peak from an input pixel value 204 to an output pixel value 230 but decreases the undershoot around the peak from an input pixel value 51 to an output pixel value 44, as shown in FIG. 7B. Thus, it may be seen from FIG. 7B that the image processing apparatus 100 can sharpen a line or dot of an input image.

As described above, the image processing apparatus 100 can individually adjust the first coefficient a, which effects the step-shape input and the second coefficient 2, effects effect the peak-shape input. Thus, the image processing apparatus 100 may adjust the first coefficient 1 and the second coefficient 2 to more flexibly sharpen an image.

The image processing apparatus 100 according to an exemplary embodiment performs an image processing method according to an embodiment of the inventive concept may have the following effects.

- In image processing to emphasize a contour, it is possible to provide a local gain to sharpen a line or dot, while inhibiting the side effect of an overshoot or undershoot.
- It is possible to independently control the change magnitudes of a step-shape pixel value and of a peak-shape pixel value.

In addition, the image processing apparatus 100 according to an exemplary embodiment may sharpen an image based on local input image information without using a mass frame memory.

In addition, since the image processing apparatus 100 according to an exemplary embodiment may adjust image processing characteristics by changing a coefficient, it is possible to adjust the image processing characteristics through a same algorithm, even when, e.g., the emphases of an image being processed changes based on a usage situation.

In addition, an image processing apparatus according to an embodiment of the inventive concept is not limited to the image processing apparatus 100, including variations thereof, according to an exemplary embodiment.

For example, an image processing apparatus according to an embodiment of the inventive concept may also adjust a frequency band to be emphasized by replacing a configuration of a frequency component extraction unit 106 in FIG. 4 with another configuration. For example, a configuration of an image processing apparatus according to another exemplary embodiment that can adjust a frequency band to be emphasized is described below.

An image processing apparatus according to another exemplary embodiment is similar to the image processing apparatus 100 except for the configuration of the frequency component extraction unit 106 in FIG. 4. Thus, a frequency component extraction unit 202 of a gain calculation unit of an image processing apparatus according to another exemplary embodiment is described below.

Figure 8:
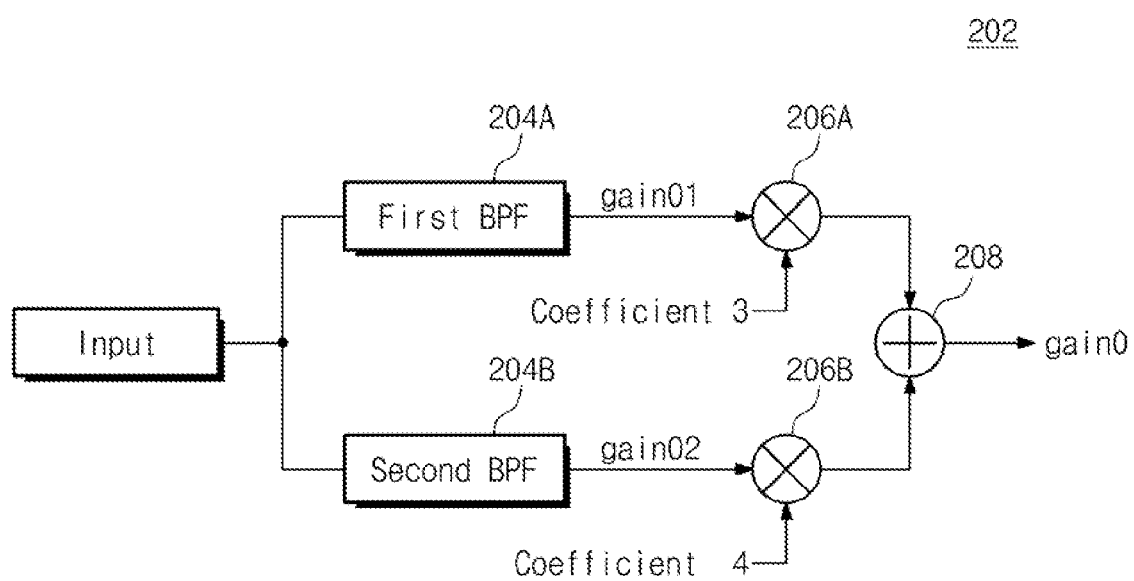
FIG. 8 is a block diagram of an example of a frequency component extraction unit of a gain calculation unit of an image processing apparatus according to another exemplary embodiment.

FIG. 8 is a block diagram of an example of the frequency component extraction unit 202 of a gain calculation unit of an image processing apparatus according to another exemplary embodiment. The frequency component extraction unit 202 includes a linear filter that has, e.g., a first BPF 204A, a second BPF 204B, multipliers 206A and 206B, and an adder 208. The signal gain0 output from the frequency component extraction unit 106 is a sum of band-limited signals that respectively correspond to the output of each BPF 204A and 204B. In exemplary embodiments, the sum of band-limited signals may be a weighted sum.

Figure 9:
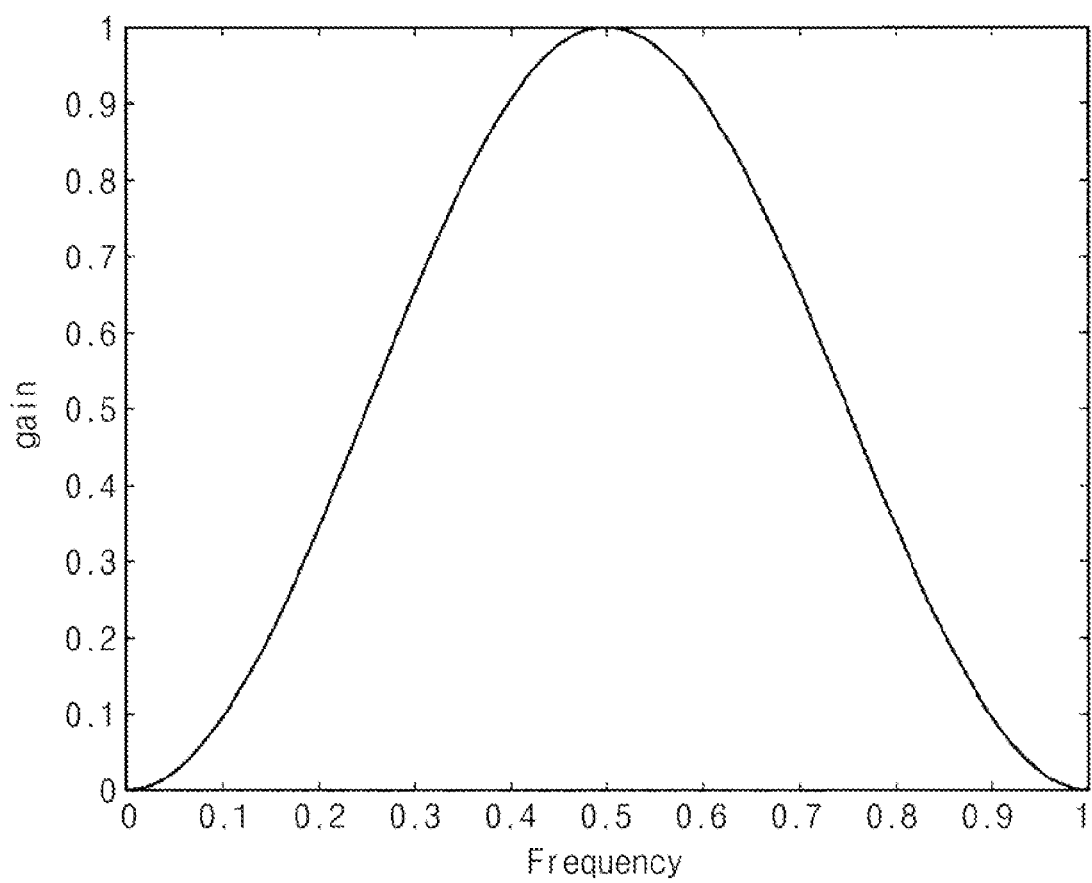
FIG. 9 illustrates an example of a characteristic of a BPF of a frequency component extraction unit 106 of an image processing apparatus 100 according to an embodiment of FIG. 4.

FIG. 9 illustrates an example of a characteristic of a BPF of the frequency component extraction unit 106 of the image processing apparatus 100 according to the first embodiment in FIG. 4. FIG. 9 illustrates a characteristic of the BPF in Equation (1) above. The number "1" of the horizontal axis in FIG. 9 represents the Nyquist frequency.

As illustrated in FIG. 9, the BPF in Equation (1) of the frequency component extraction unit 106 of the image processing apparatus 100 has a peak in a region of about half the Nyquist frequency.

Depending on the input image characteristics, there may a need to emphasize the contour of another frequency band. In such a case, by adjusting a frequency characteristic using linear filters, such as the plurality of BPFs illustrated in FIG. 8, it is possible to adjust a frequency band to be emphasized, to independently adjust responses to the step-shape input and the peak-shape input described above.

For example, for an input where there are relatively many low frequency components, emphasis processing may be performed on a region of about 30% to about 50% of the Nyquist frequency. In this case, the frequency component extraction unit 202 may have a filter that extracts a signal of a frequency band on which a contour is emphasized.

In particular, the frequency component extraction unit 202 includes a linear filter as represented on the right side in Equation (11) below.

For example, a filter represented by [−1, −3, 1, 6, 1, −3, −1] in Equation (11) below corresponds to an example of the first BPF 204A. In addition, a filter represented by [−3, −1, 2, 4, 2, −1, −3] in Equation (11) below corresponds to an example of the second BPF 204B.

Further, the third and fourth coefficients 3 and 4 in Equation 11 below may be e.g., a preset fixed value or a variable that may be adjusted by a user of the image processing apparatus 100. Examples of third and fourth coefficients 3 and 4 are about, 0.5 but embodiments are not limited thereto.

$$\text{gain } 0 = \frac{\{\text{coefficient } 3 \times [-1, -3, 1, 6, 1, -3, -1] \otimes \text{input} + \text{coefficient } 4 \times [-3, -1, 2, 4, 2, -1, -3] \otimes \text{input}\}}{16}. \quad (11)$$

Figure 10:
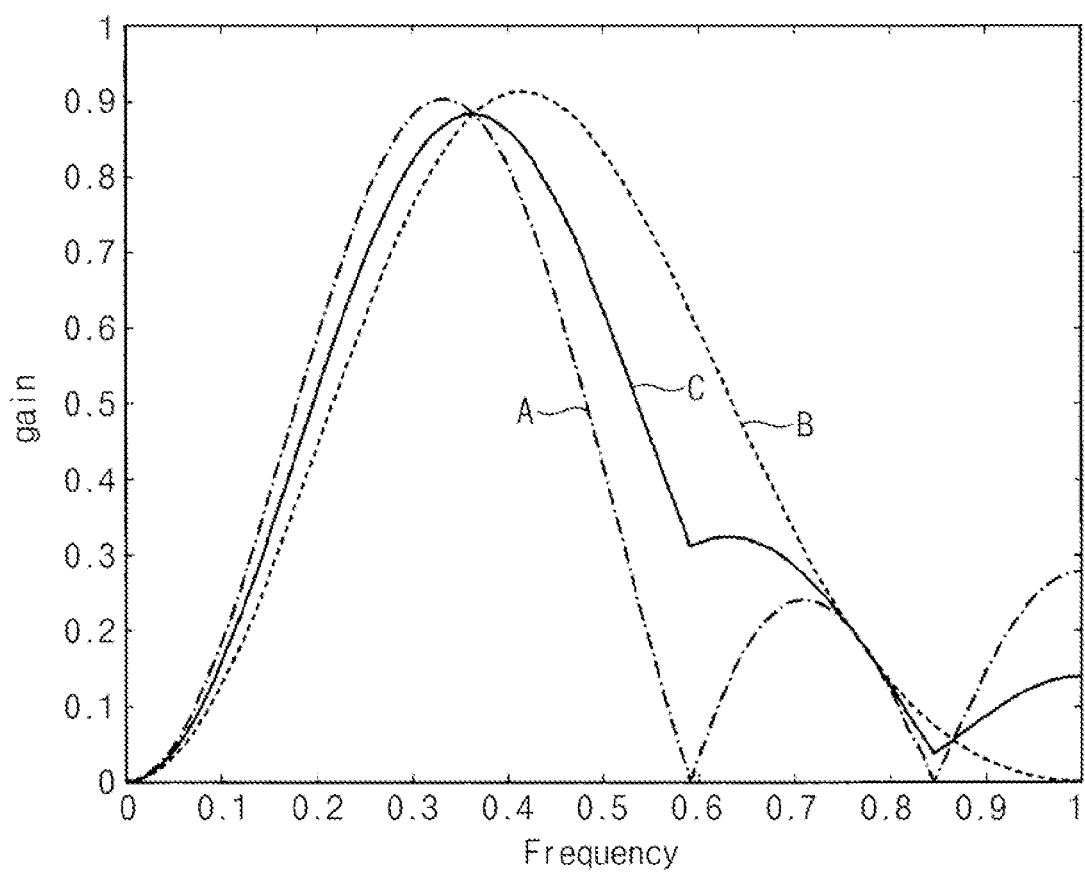
FIG. 10 illustrates a frequency component extraction unit of a gain calculation unit of an image processing apparatus according to another exemplary embodiment.

FIG. 10 illustrates the frequency component extraction unit 202 of a gain calculation unit of a image processing apparatus according to another exemplary embodiment, and illustrates an example of the frequency characteristic of a linear filter of the frequency component extraction unit 202 in FIG. 8. The number 1 on the horizontal axis in FIG. 10 represents the Nyquist frequency.

The upper-case letter A in FIG. 10 represents the frequency characteristic of the filter of a first term in Equation (11) above, the upper-case letter B in FIG. 10 represents the frequency characteristic of the filter of a second term in Equation (11) above, and the upper-case letter C in FIG. 10 represents the frequency characteristic of a linear filter in Equation (11) above. In addition, FIG. 10 represents the frequency characteristic when the third and fourth coefficients 3 and 4 are about 0.5.

As represented by the upper-case letter A in FIG. 10, the first term filter in Equation (11) has a peak around about 30% of the Nyquist frequency and as represented by the upper-case letter B in FIG. 10, the second term filter in Equation (11) has a peak around about 45% of the Nyquist frequency. Thus, the linear filter in Equation (11) is a combination of the first term filter of Equation (11) and the second term filter of Equation (11), and is a linear filter having a gain of about 30% to about 50% of the Nyquist frequency, as represented by the upper-case letter C in FIG. 10.

Also, the configuration of the frequency component extraction unit 202 according to another exemplary embodiment is not limited to a linear filter having the configuration in FIG. 8 and Equation (11). For example, the frequency component extraction unit 202 according to another embodiment may also include a linear filter having any specific frequency characteristic. The specific frequency characteristic may be preset or adjustable by a user according to usage situation.

For example, an image processing apparatus according to another exemplary embodiment may have the frequency component extraction unit 202 that includes a linear filter having a specific frequency characteristic for processing an input image having many frequency characteristics, and may process an image more flexibly.

For example, by combining Equations (7) to (9) and (11) above, Equation (12) below is obtained. In this example, "BPF1" in Equation (12) can be represented by, e.g., Equation (13), which represents a BPF having a peak around about 30% of the Nyquist frequency, "BPF2" in Equation (12) can be represented by, e.g., Equation (14), which represents a BPF having a peak around about 45% of the Nyquist frequency. It is to ne understood that "BPF1" and "BPF2" in Equation (12) are not limited to examples in Equations (13) and (14).

same configuration as an image processing apparatus according to an embodiment of FIG. 4, it may have a same effect as an image processing apparatus according to an exemplary embodiment as described above.

Although an image processing apparatus has been described above in exemplary embodiments of the inventive concept, embodiments of the inventive concept are not limited thereto. Exemplary embodiments of the inventive concept may be used in many devices that can process an image signal, such as a computer, such as a personal computer or server, a tablet-type device, a communication device such as a mobile phone or smart phone, and a display device such as a TV set or monitor.

A program enabling a computer to function as an image processing apparatus according to exemplary embodiments of the inventive concept can executed on a computer process an image to have improved image quality.

In addition, a program enabling a computer to function as an image processing apparatus according to exemplary embodiments of the inventive concept can be executed on the computer and can have the same effect as an image processing apparatus according to exemplary embodiments of the inventive.

In addition, although exemplary embodiments of the inventive concept have been described with reference to the accompanying drawings, embodiments of the inventive concept are not limited thereto. A person skilled in the art may clearly appreciate that it is possible to envisage many changes and modifications within the scope of the following claims, which are to be construed so that they also fall within the technical scope of the inventive concept.

For example, it has been described that a computer program can enable a computer to function as an image processing apparatus according to an embodiment of the inventive concept, but an embodiment of the inventive concept may also provide a recording medium for the program.

According to an embodiment of the inventive concept, an image can be processed to have improved image quality.

The above-disclosed subject matter is to be considered illustrative and not restrictive, and the appended claims are intended to cover all such modifications, enhancements, and other embodiments, which fall within the true spirit and scope of embodiments of the inventive concept. Thus, to the maximum extent allowed by law, the scope of the embodiments of the inventive concept is to be determined by the $$\text{gain} = \frac{\{\nearrow \overset{coefficient}{3} \cdot bpf1 \otimes \text{input} + \nearrow \overset{coefficient}{4} \cdot bpf2 \otimes \text{input}\}}{16} \cdot \frac{\{\nearrow \overset{coefficient}{1} \cdot \text{dl\_avg} + \nearrow \overset{coefficient}{2} \cdot \text{d2\_avg}\}}{\text{normalization coefficient}} \qquad (12)$$

$$= \{\searrow \underset{coefficient}{A} \cdot \text{d2\_avg} \cdot bpf1 + \searrow \underset{coefficient}{B} \cdot \text{d1\_avg} \cdot bpf1 + \searrow \underset{coefficient}{C} \cdot \text{d2\_avg} \cdot bpf2 + \searrow \underset{coefficient}{D} \cdot \text{d1\_avg} \cdot bpf2\} \otimes \text{input}$$

$$bpf1 = [-3, -1, 2, 4, 2, -1, -3]. \qquad (13)$$

$$bpf2 = [-1, -3, 1, 6, 1, -3, -1]. \qquad (14)$$

Referring to Equation (12) above, it is possible to adjust coefficients A to D as independent variables, depending on a frequency characteristic and the degree of emphasis in a contour shape. Thus, an image processing apparatus according to another exemplary embodiment may be more flexible in filter design.

In addition, since an image processing apparatus according to another exemplary embodiment has substantially the broadest permissible interpretation of the following claims and their equivalents, and shall not be restricted or limited by the foregoing detailed description.

What is claimed is:

1. An image processing apparatus comprising:
   a gain calculation unit that calculates a gain for each of a plurality of pixels of an image signal; and an addition unit that adds the gain for each pixel to the corresponding pixel of the plurality of pixels of the image signal, wherein the gain calculation unit includes a first order differential operation unit that calculates a first value for each of the plurality of pixels from one of an average value or a maximum value of absolute values of first order differential values of a target pixel and at least one adjacent pixel of the image signal and a second order differential operation unit that calculates a second value for each of the plurality of pixels from one of an average value or a maximum value of absolute values of second order differential values of the target pixel and the at least one adjacent pixel of the image signal, wherein the gain for each pixel is calculated based on the first and second values for each pixel.

2. The image processing apparatus of claim 1, wherein the first differential is a spatial difference between pixel values of the target pixel of the plurality of pixels and the at least one pixel adjacent to the target pixel, and the second differential is a difference between first differential values of the target pixel and the at least one pixel adjacent to the target pixel.

3. The image processing apparatus of claim 1, wherein the first value is multiplied by a first coefficient, and the second value is multiplied by a second coefficient.

4. The image processing apparatus of claim 1, wherein the gain calculation unit includes a multiplication unit that calculates gains by adding the first value and the second value for each of the plurality of pixels.

5. The image processing apparatus of claim 4, wherein the multiplication unit multiplies the gains by a frequency component extracted from the image signal.

6. The image processing apparatus of claim 5, wherein the frequency component extracted from the image signal comprises a sum of two or more band-limited components extracted from the image signal.

7. An image processing method comprising:

receiving an input image that includes a plurality of pixels;

calculating a gain for each pixel of the plurality of pixels, based on the image signal; and adjusting the image signal by adding the gain to each pixel value of a corresponding pixel of the plurality of pixels, wherein calculating a gain comprises:

calculating a first value for each of the plurality of pixels based on one of an average value or a maximum value of absolute values of first order differential values of a target pixel and at least one adjacent pixel of the input image;

calculating a second value for each of the plurality of pixels based on one of an average value or a maximum value of absolute values of second order differential of the input image; and calculating the gain for each pixel based on the first value for each pixel and the second value for each pixel.

8. The method of claim 7, further comprising calculating the first differential from a spatial difference between pixel values of the target pixel of the plurality of pixels and a pixel value of the at least one pixel adjacent to the target pixel, and calculating the second differential from a difference between first differential values of the target pixel and the at least one pixel adjacent to the target pixel.

9. The method of claim 7, further comprising multiplying the first value by a first coefficient, and multiplying the second value by a second coefficient.

10. The method of claim 7, further comprising calculating gains by adding the first value and the second value for each of the plurality of pixels.

11. The method of claim 10, further comprising multiplying the gains by a frequency component extracted from the image signal.

12. The method of claim 11, wherein the frequency component extracted from the image signal comprises a sum of two or more band-limited components extracted from the image signal.

13. An image processing apparatus comprising:

a gain calculation unit that calculates a gain for each of a plurality of pixels of an image signal;

an addition unit that adds the gain for each pixel to the corresponding pixel of the plurality of pixels of the image signal wherein the gain calculation unit includes a first order differential operation unit that calculates for each of the plurality of pixels a first value from one of an average value or a maximum value of absolute values of first order differential values of a target pixel and at least one adjacent pixel of the image signal, a second order differential operation unit that calculates for each of the plurality of pixels a second value from one of an average value or a maximum value of absolute values of second order differential values of the target pixel and the at least one adjacent pixel of the image signal a frequency component extraction unit that extracts one or more frequency components from the image signal, and a multiplication unit that calculates the gain for each pixel by multiplying the one or more frequency components by a sum of the first value for each pixel and the second value for each pixel.

14. The image processing apparatus of claim 13, wherein the frequency component extraction unit includes one or more band-pass filters, wherein each band pass filter outputs a band-limited signal of a different frequency component of the image signal, and the frequency component extraction outputs a sum of the band-limited signals output by each of the one or more band-pass filters.

15. The image processing apparatus of claim 13, further comprising:

a first adjustment unit that multiplies the first value by a first coefficient, and a second adjustment unit that multiplies the second value by a second coefficient.

* * * * *